United States Patent
Colpo et al.

(10) Patent No.: US 6,738,887 B2
(45) Date of Patent: May 18, 2004

(54) METHOD AND SYSTEM FOR CONCURRENT UPDATING OF A MICROCONTROLLER'S PROGRAM MEMORY

(75) Inventors: Yolanda Colpo, Tucson, AZ (US); Enrique Garcia, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 274 days.

(21) Appl. No.: 09/907,160

(22) Filed: Jul. 17, 2001

(65) Prior Publication Data

US 2003/0018873 A1 Jan. 23, 2003

(51) Int. Cl.[7] .............................................. G06F 13/00
(52) U.S. Cl. ....................... 711/202; 711/154; 711/168
(58) Field of Search ................................ 711/154, 168, 711/202

(56) References Cited

U.S. PATENT DOCUMENTS

| | | | |
|---|---|---|---|
| 5,544,107 A | * 8/1996 | Hill | 365/201 |
| 5,640,538 A | * 6/1997 | Dyer et al. | 703/23 |
| 5,640,583 A | * 6/1997 | Assouad et al. | 713/600 |
| 5,655,135 A | 8/1997 | Sholander et al. | 395/427 |
| 5,684,972 A | * 11/1997 | Hill et al. | 711/4 |
| 5,703,584 A | * 12/1997 | Hill | 341/141 |
| 5,826,093 A | * 10/1998 | Assouad et al. | 712/43 |
| 5,884,027 A | * 3/1999 | Garbus et al. | 709/250 |
| 5,913,045 A | * 6/1999 | Gillespie et al. | 710/311 |
| 5,963,497 A | 10/1999 | Holland | 365/222 |
| 6,016,547 A | 1/2000 | Ono | 713/300 |

FOREIGN PATENT DOCUMENTS

| | | |
|---|---|---|
| JP | 11189113 A | 7/1999 |
| JP | 2000000606 A | 1/2000 |
| JP | 2000000804 A | 1/2000 |
| JP | 2000215277 A | 8/2000 |

* cited by examiner

*Primary Examiner*—Reba I. Elmore
(74) *Attorney, Agent, or Firm*—Edmund P. Pfleger; Hayes, Soloway, Hennessey, Grossman & Hage P.C.; Allen K. Bates

(57) ABSTRACT

A system and method for concurrent operations in a microcontroller's program memory is provided. In one exemplary embodiment, a microcontroller system is provided that includes a microcontroller, programmable read-only memory (PROM), random access memory (RAM) and a bridge circuit disposed between the PROM and microcontroller. The bridge is adapted with memory-mapped registers to map specific address locations from RAM to PROM, to permit the microcontroller to update PROM while concurrently executing code from RAM. In another exemplary embodiment, the bridge circuitry includes microcontroller reset and RAM enable/disable capabilities to further efficiently manage memory resources.

18 Claims, 4 Drawing Sheets

METHOD AND SYSTEM FOR CONCURRENT UPDATING OF A MICROCONTROLLER'S PROGRAM MEMORY

BACKGROUND OF THE INVENTION

1. Field of the Invention

The present invention relates to a system and methodology to permit concurrent execution and update of a microcontroller's program memory. More specifically, the present invention provides a system and methodology for permitting a microcontroller to execute code from random access memory (RAM) while simultaneously allowing a microcontroller to update programmable read-only memory (PROM). A particular utility for the present invention is in microcontroller based applications, including general applicability to any process system capable of addressing data in two distinct memory units, for example, RAM and PROM.

2. Background of the Invention

A minimal microcontroller based system typically uses a microcontroller to execute a program which has been loaded into PROM such as flash electrically erasable programmable read-only memory (EEPROM). While simple and economical, a number of complications arise when there is a requirement to concurrently update the program memory while simultaneously executing out of the same memory. One traditional solution is to divide the program memory into "pages" and execute out of one page while updating another page, which works for some types of memory devices but not for others such as a typical flash EEPROM which must first be erased completely before it can be written. Another classical solution, and as shown in the system 100 of FIG. 1, is to divide available program space between volatile RAM 14 and PROM 16 in which the system microcontroller 12 copies its program from PROM to RAM from which it executes while updating PROM. However, as is well understood in the art, the amount of data that can be copied from PROM into RAM is limited by the number of address lines 18 (A0. . . A15) available to the microcontroller for accessing data in both PROM and RAM, since the microcontroller cannot uniquely separate (i.e., uniquely address) PROM from RAM. The system 100 also includes a memory bus 20 to permit read/write access to both PROM and RAM.

While both of the aforementioned techniques are common, both preclude using the complete microcontroller memory space for normal program code and also require complicated programming algorithms. In the first case, pages are wasted, and in the other case a copy of the code in RAM wastes space. For example, in the system and methodology disclosed in FIG. 1, if the RAM and PROM were both 64 k memory, only 32 k of program code from PROM could be copied into RAM since only 16 address lines (i.e., 64 k of address space addressed by address lines A0–A15) can be accessed by the microcontroller. Moreover, PROM cannot be updated while the controller is accessing code from RAM.

Accordingly, there exists a need to provide an economical solution to the aforementioned difficulties of the prior art to permit concurrent read/write operations from RAM while updating the PROM memory, to provide reset control of the microcontroller and to provide enable/disable control over RAM.

SUMMARY OF THE INVENTION

Broadly defined, the present invention provides a system for allocating and controlling memory read/write operations. In exemplary embodiments, the system includes a bridge circuit disposed between a microcontroller and a first memory (e.g., PROM). The bridge circuit and the microcontroller have read/write access to a second memory. The bridge circuit includes memory mapped registers adapted to map predetermined address locations from the second memory to the first memory to provide concurrent read/write access to the second memory and the first memory.

In system embodiments, the present invention also provides microcontroller system, that comprises a microcontroller, a memory bus, a first memory accessed by the microcontroller over the memory bus, a second memory accessed by the microcontroller over the memory bus, and a bridge circuit disposed between the microcontroller and the second memory. The bridge circuit includes memory mapped registers adapted to map predetermined address locations from the first memory to the second memory.

In method form, exemplary embodiments include a method for concurrent access to a microcontroller's memory. The method comprises the steps of defining a plurality of memory mapped registers; and mapping address locations from a first memory to a second memory to permit read or write operations to the second memory based on the address locations.

In still another exemplary method of the present invention, a method for concurrent access to a microcontroller's memory is provided that includes the steps of defining a plurality of memory mapped registers to map address locations from a first memory to a second memory; determining the value of an address location; and mapping read or write operations to the second memory if the address location matches the address location of the memory mapped registers.

It will be appreciated by those skilled in the art that although the following Detailed Description will proceed with reference being made to preferred embodiments and methods of use, the present invention is not intended to be limited to these preferred embodiments and methods of use. Rather, the present invention is intended to be limited only as set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE EXEMPLARY EMBODIMENTS

Figure 2:
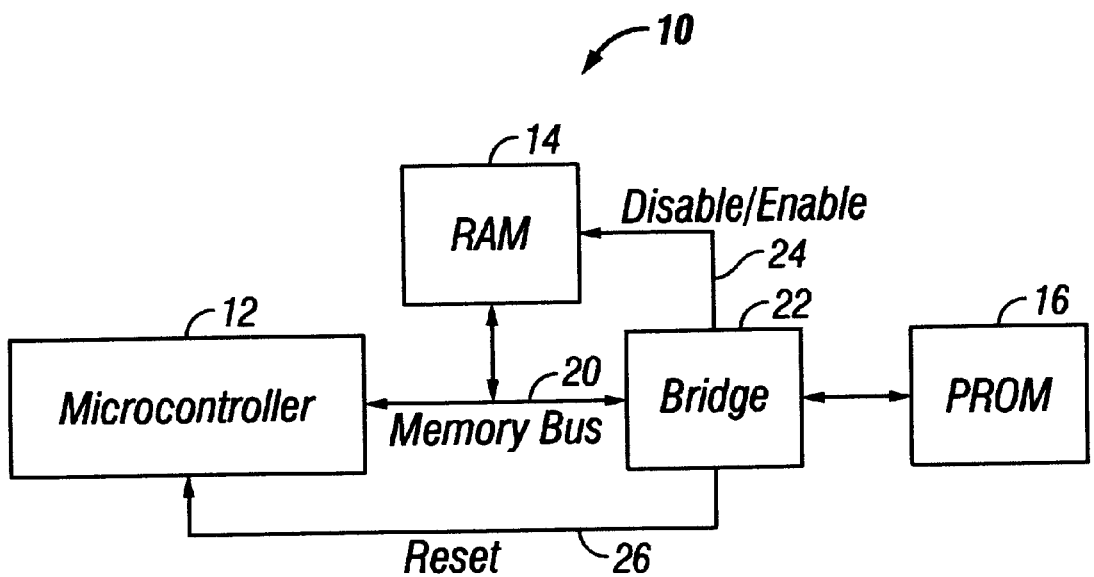
FIG. 2 depicts a block diagram representation of a microcontroller system according to one exemplary embodiment of the present invention.

FIG. 2 depicts a block diagram of a microcontroller based system 10 according to one exemplary embodiment of the present invention. The system includes a microcontroller 12 RAM memory 14 and PROM memory 16. It is to be understood at the outset that the microcontroller 12, RAM 14 and PROM 16 can be any dedicated, custom or off the shelf components that fall under the broad categories of processor and memory. In this exemplary embodiment, a bridge circuit 22 is placed along the memory bus 20 between the microcontroller 12 and PROM memory. The bridge circuitry comprises registers and memory access circuitry to control read/write operations between the microcontroller and PROM, between the microcontroller and RAM, and reset and disable signal generating circuitry to generate disable/enable and reset commands, as will be described in detail below. As an overview, the bridge circuitry 22 of this exemplary embodiment is operable to provide a supervisory function for the microcontroller by managing the microcontroller's hardware reset functionality, and to provide memory mapped registers so that the microcontroller can indirectly access PROM 16 while simultaneously executing code from RAM 14. These and other features of the exemplary embodiment of the present invention are set forth below.

Figure 3:
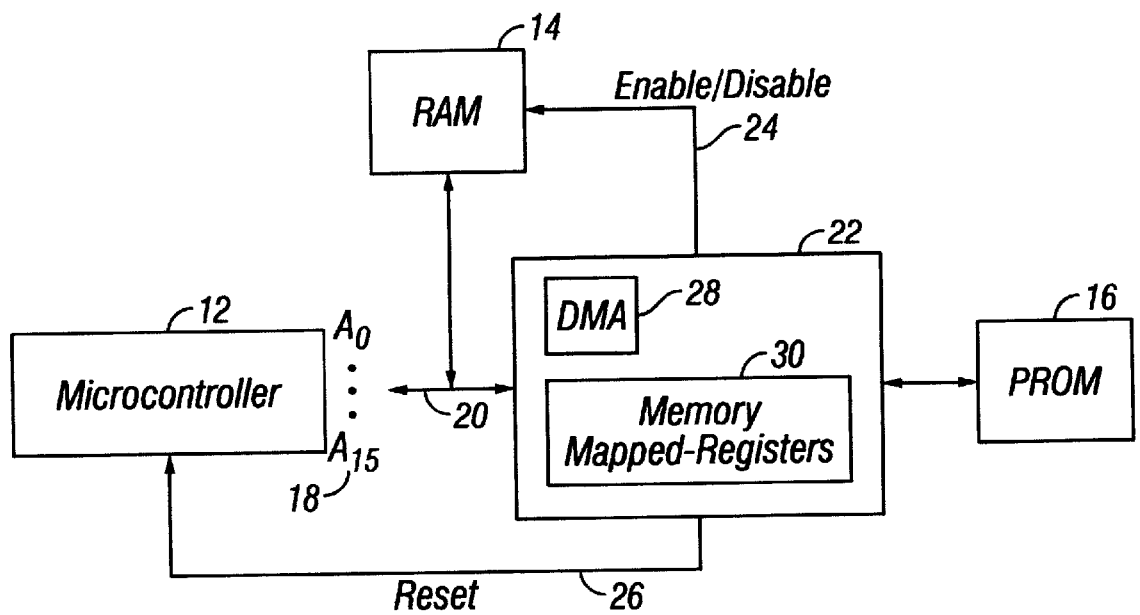
FIG. 3 depicts a more detailed block diagram of the exemplary embodiment of FIG. 2.

Referring now to FIG. 3, a more detailed block diagram representation of the bridge circuitry 22 in the microcontroller system 10 is depicted. The bridge circuitry essentially comprises DMA circuitry 28 to control direct read/write processes between PROM 16 and RAM 14, independent of microcontroller 12. Memory mapped registers 30 are provided to map one or more memory address locations 18 (A0 ... A15) to PROM memory. In the exemplary embodiment, the memory mapped registers are selected at predetermined address locations such that when the bridge 22 receives a dedicated address from the microcontroller 12, the bridge 22 responds to this address to perform read/write operations in PROM 16 instead of RAM 14. In other words, the address locations normally reserved for RAM access are instead mapped to PROM via memory mapped registers 30. Although not shown in FIG. 3, those skilled in the art will recognize that bridge circuitry 22 further comprises appropriate circuitry to generate an enable/disable signal 24 and a reset signal 26 to enable or disable RAM 14 and reboot or reset the microcontroller 12, respectively.

Figure 1:
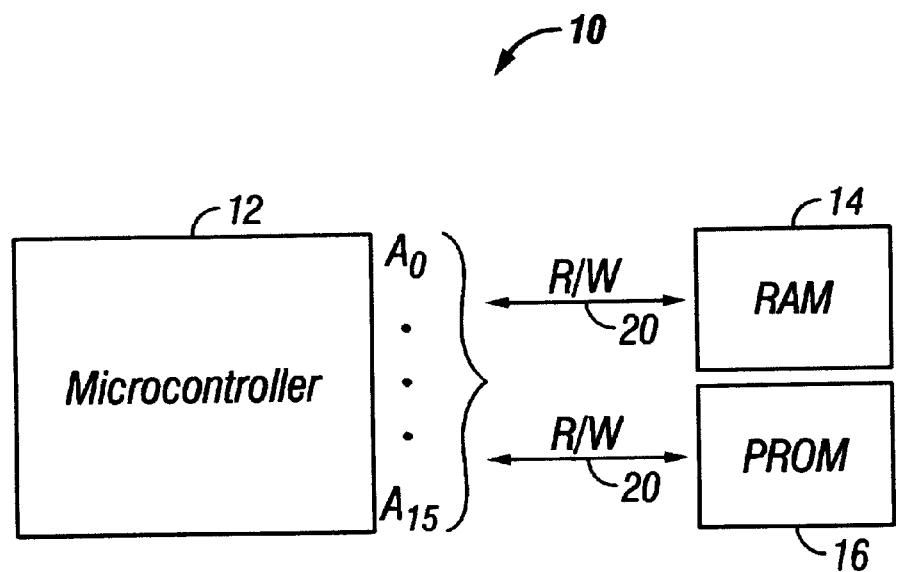
FIG. 1 depicts a block diagram representation of a microcontroller system of the prior art.

Essentially, the bridge circuitry 22 of the present invention provides three distinct operations for overcoming the deficiencies of the microcontroller system of FIG. 1. The first function of the bridge circuitry is depicted in flow chart form in FIG. 4. A first operation is a DMA operation between PROM and RAM to copy the contents of PROM into RAM (independently of the microcontroller) during system startup or reset. A second operation is a memory mapping technique to map predetermined address location normally intended for RAM read/write operations to PROM read/write operations, thus permitting the controller to access code from RAM while simultaneously updating PROM. A third operation is to define memory mapped registers to enable the bridge to initiate controller reset (or reboot) functions, and to provide RAM enable/disable functions when the controller addresses PROM via the bridge.

Figure 4:
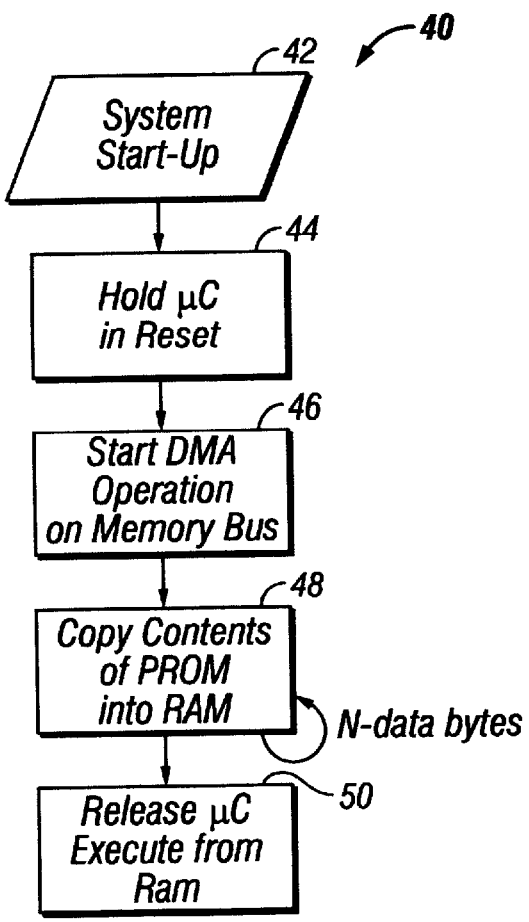
FIG. 4 depicts a flow chart of a reset operation according to one exemplary embodiment of the present invention.

FIG. 4 depicts a system start up flow chart 40. The first step in this process is when the bridge circuitry receives a system start up command 42. Upon receipt of such command, bridge circuitry generates a reset signal 26 to hold the microcontroller in a reset condition 44. The bridge circuitry then begins a DMA operation on the memory bus 46. The bridge circuitry 22 copies the contents of PROM into RAM 48 and continues this operation for all the data contained in PROM. Unlike the prior art systems, the bridge circuitry of the present invention permits the entire contents of PROM to be copied into RAM since only a few bytes of memory are required to access PROM via the memory mapped registers. Upon completion of the copy process, the bridge circuitry 22 releases the microcontroller to execute code from RAM 50.

Figure 5:
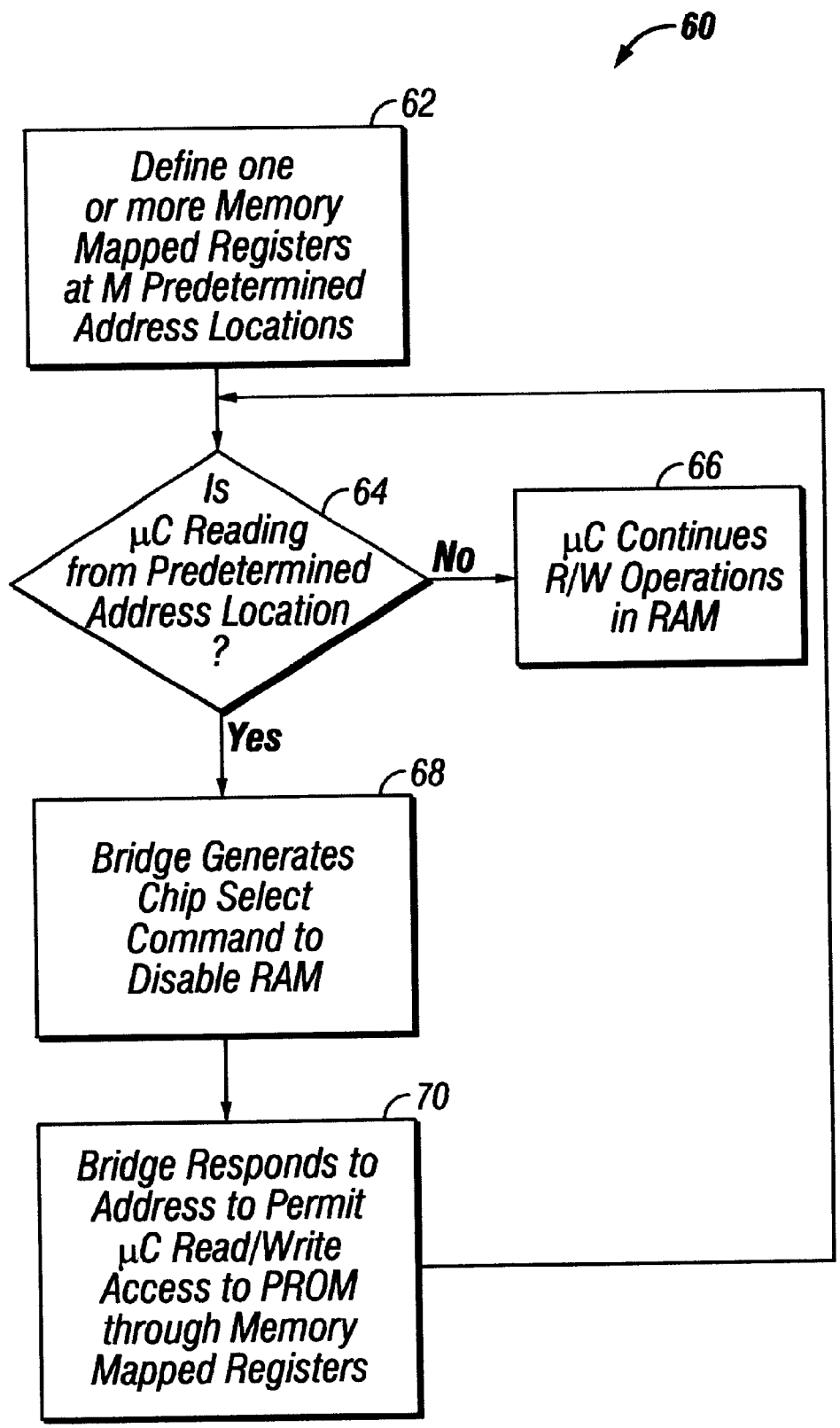
FIG. 5 depicts a flow chart for address memory mapping between PROM and RAM according to one exemplary embodiment of the present invention.

FIG. 5 depicts a flow chart 60 of a second feature of the bridge circuitry of the present invention which permits the controller to simultaneously read and write data from RAM while updating PROM. The bridge circuitry of the present invention uses memory mapped registers to map specific address locations from RAM into PROM to permit the microcontroller to perform read/write operations in PROM while simultaneously executing data from RAM. Thus, one or more memory mapped registers are defined at predetermined address locations 62. The address locations chosen for the memory mapped registers may be chosen according to the address lines used by the microcontroller to update code and/or generate reboot commands. The bridge circuitry, since it is located along the memory bus 20, determines if the microcontroller is reading from the predetermined address locations defined by the memory mapped registers 64. If not, the microcontroller continues read/write operations in RAM 66. If the microcontroller is reading from the address location defined by a memory mapped register, the bridge circuitry generates a chip select command to disable RAM 68. The bridge then responds to the address to permit the microcontroller read/write access to PROM through the memory mapped registers 70. This process continues for address operations performed by the microcontroller.

Figure 6:
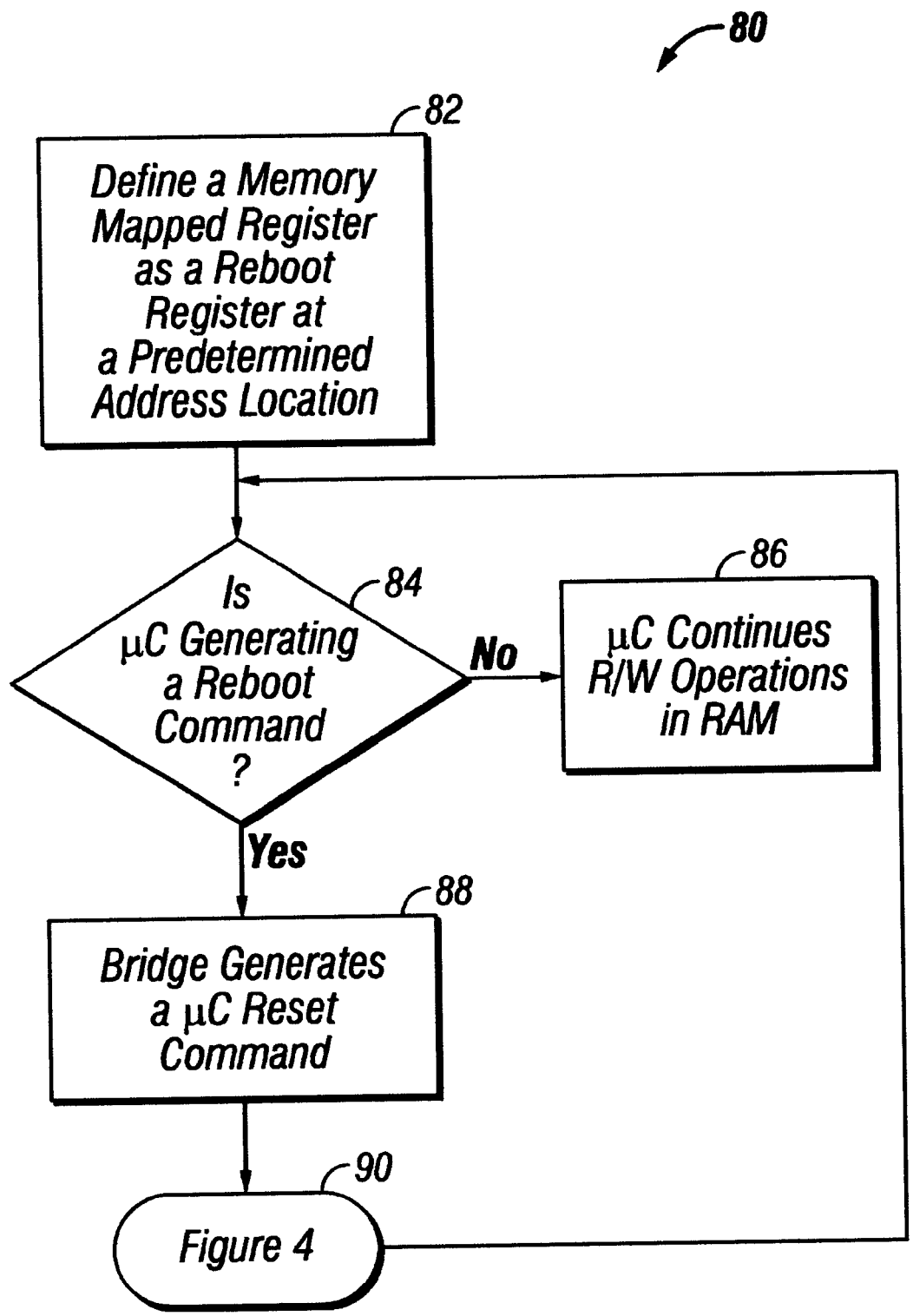
FIG. 6 depicts a flow chart for a reboot operation according to one exemplary embodiment of the present invention.

FIG. 6 depicts a flow chart 80 of a third aspect of the present invention, in which one of the memory mapped registers can be defined as a reboot register at a predetermined address location 82. The bridge circuitry determines if the microcontroller is generating a reboot command 84 and if not, the microcontroller continues read/write operations in RAM 86. If a reboot command is generated, the bridge circuitry generates a microcontroller reset command 88. During reset, the bridge circuitry copies data from PROM 16 into RAM 14 (FIG. 4) shown at step 90.

Advantageously, the bridge circuitry 22 of the present invention is operable independent of the type of PROM, and with only a few bytes of available space dedicated to memory mapped registers. Thus, optimal utilization of the microcontroller's program memory is realized. Those skilled in the art will recognize numerous modifications to the present invention, and all such modifications are deemed within the spirit and scope of the present invention, only as limited by the claims.

What is claimed is:

1. A microcontroller system, comprising:
a microcontroller;
a memory bus;
a first memory accessed by said microcontroller over said memory bus;
a second memory accessed by said microcontroller over said memory bus; and
a bridge circuit disposed between said microcontroller and said second memory, said bridge circuit comprising memory mapped registers adapted to map predetermined address locations from said first memory to said second memory to enable said microcontroller to indirectly access said second memory while simultaneously executing code from said first memory.

2. A microcontroller system as claimed in claim 1, said bridge circuit further comprising reset circuitry to generate a reset command to said microcontroller.

3. A microcontroller system as claimed in claim 1, said bridge circuit further comprising enable/disable circuitry to generate at least one of an enable and a disable command signal to said first memory when said microcontroller accesses one of said predetermined address locations to permit said microcontroller read/write access to said second memory.

4. A microcontroller system as claimed in claim 1, said bridge circuit further comprising a memory mapped register adapted to receive a reboot command from said microcontroller and generate a reset command to said microcontroller.

5. A microcontroller system as claimed in claim 1, wherein said first memory comprises RAM.

6. A microcontroller system as claimed in claim 1, wherein said second memory comprises PROM.

7. A microcontroller system as claimed in claim 1, said bridge circuit further comprising DMA circuitry to enable said bridge circuitry operable to copy the contents of said second memory into said first memory independently of said microcontroller.

8. A microcontroller system, comprising:
a microcontroller;
a memory bus;
a first memory accessed by said microcontroller over said memory bus;
a second memory accessed by said microcontroller over said memory bus; and
a bridge circuit disposed between said microcontroller and said second memory, said bridge circuit comprising memory mapped registers adapted to map predetermined address locations from said first memory to said second memory to provide concurrent read/write access to said first memory and said second memory and wherein said bridge circuit further comprising a memory mapped register adapted to receive a reboot command from said microcontroller and generate a reset command to said microcontroller.

9. A microcontroller system, comprising:
a microcontroller;
a memory bus;
a first memory accessed by said microcontroller over said memory bus;
a second memory accessed by said microcontroller over said memory bus; and
a bridge circuit disposed between said microcontroller and said second memory, said bridge circuit comprising memory mapped registers adapted to map predetermined address locations from said first memory to said second memory to provide concurrent read/write access to said first memory and said second memory, and further comprising DMA circuitry operable to copy the contents of said second memory into said first memory independently of said microcontroller and wherein said bridge circuit further comprising a memory mapped register adapted to receive a reboot command from said microcontroller and genera e a reset command to said microcontroller.

10. A method for concurrent access to a microcontroller's memory, said method comprising the steps of:
defining a plurality of memory mapped registers;
mapping address locations from a first memory to a second memory to permit read or write operations to said second memory based on said address locations; and
said microcontroller indirectly accessing said second memory while simultaneously executing code from said first memory.

11. A method for concurrent access to a microcontroller's memory, said method comprising the steps of:
defining a plurality of memory mapped registers to map address locations from a first memory to a second memory;
determining the value of an address location;
mapping at least one of a read and a write operation to said second memory if said address location matches the address location of said memory mapped register; and
defining a memory mapped reboot register at a predetermined address in bridge circuitry adapted to receive a reboot command from said microcontroller and generate a reset command to said microcontroller.

12. A system for allocating and controlling memory read/write operations, comprising a bridge circuit disposed between a microcontroller and a first memory, said bridge circuit and said microcontroller having access to a second memory, said bridge circuit comprising memory mapped registers adapted to map predetermined address locations from said second memory to said first memory to provide concurrent read/write access to said second memory and said first memory to enable said microcontroller to indirectly access said second memory while simultaneously executing code from said first memory.

13. A system as claimed in claim 12, said bridge circuit further comprising DMA circuitry operable to copy the contents of said first memory into said second memory independently of said microcontroller.

14. A system as claimed in claim 12, said bridge circuit further comprising reset circuitry to generate a reset command to said microcontroller.

15. A system as claimed in claim 12, said bridge circuit further comprising enable/disable circuitry to generate at least one of an enable and a disable command signal to said second memory when said microcontroller accesses one of said predetermined address locations to permit said microcontroller read/write access to said first memory.

16. A system as claimed in claim 12, said bridge circuit further comprising a memory mapped register adapted to receive a reboot command from said microcontroller and generate a command to said microcontroller.

17. A system as claimed in claim 12, wherein said second memory comprises RAM.

18. A system as claimed in claim 12, wherein said first memory comprises PROM.

* * * * *